E. L. CAUM.

Draft and Buffing Apparatus for Railroad-Cars.

No. 8,095. Reissued Feb. 19, 1878.

Witnesses.

Geo. A. Vaillant.

Chas. H. Chaney

Inventor.

Edmund L. Caum.

By J. Snowden Bell, atty.

UNITED STATES PATENT OFFICE.

EDWARD L. CAUM, OF HARRISBURG, ASSIGNOR OF SEVEN-EIGHTHS OF HIS RIGHT TO CAROLINE J. DOUGHERTY, OF SAME PLACE, W. D. MOORE, OF WILKESBARRE, HENRY LEVIS, FREDERICK J. KIMBALL, AND J. SNOWDEN BELL, OF PHILADELPHIA, PENNSYLVANIA.

IMPROVEMENT IN DRAFT AND BUFFING APPARATUS FOR RAILROAD-CARS.

Specification forming part of Letters Patent No. 71,580, dated December 3, 1867; Reissue No. 8,095, dated February 19, 1878; application filed December 19, 1877.

*To all whom it may concern:*

Be it known that I, EDWARD L. CAUM, formerly of Patterson, in the county of Juniata and State of Pennsylvania, but now of Harrisburg, in the county of Dauphin and State aforesaid, have invented certain new and useful Improvements in Draft and Buffing Apparatus for Railroad-Cars, of which improvements the following is a specification:

The object of my invention is to relieve the frames of railroad-cars from the injurious action of the shocks and strains to which they are subjected under the common modes of construction, by providing a draft and buffing apparatus in the operation of which the tractive force of the engine in drawing a train forward is separately applied to each car of the train, so that the frame thereof shall not receive or sustain any portion of the strain due to the weight of the remaining cars of the train, and in which the draft-rods shall not be subjected to any strains of compression in backing the train, or by the contact of one car with another in the act of buffing.

To this end my invention consists in the combination, with a railroad-car frame, of two yielding bumpers or draw-heads, each provided with a bumper-spring, an intermediate rigid connection upon which said draw-heads have freedom of movement, and fixed abutments by which pulling or pushing strains applied to either of the draw-heads are transferred to the frame-bolsters.

The improvements claimed are hereinafter more fully set forth.

Figure 1:
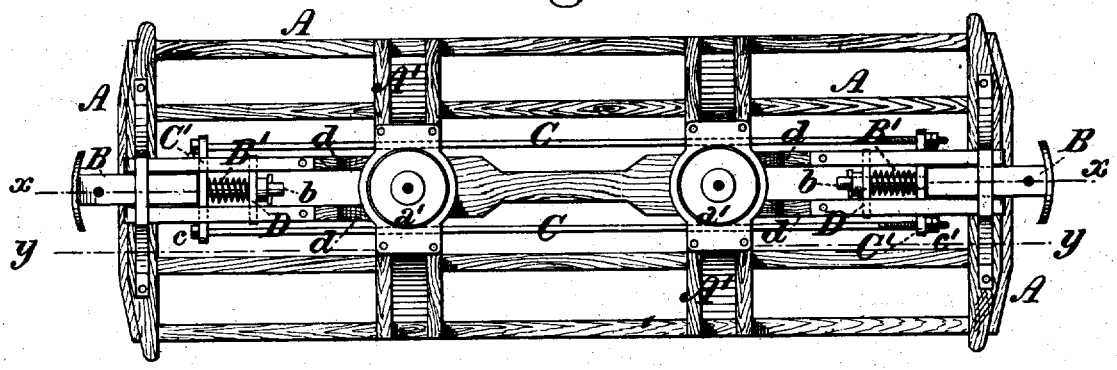
Figure 2:
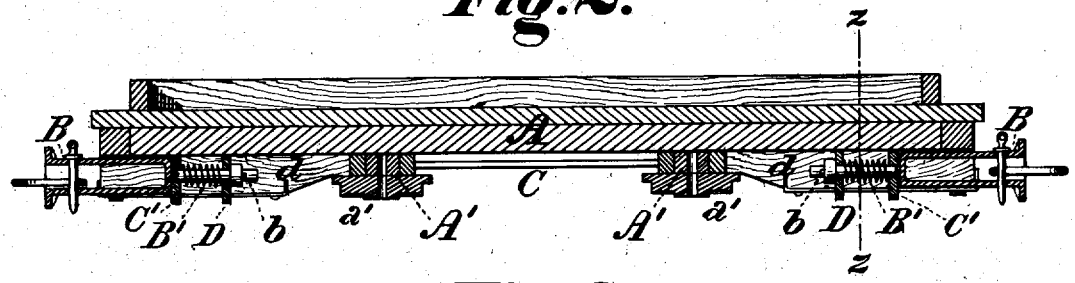
Figure 3:
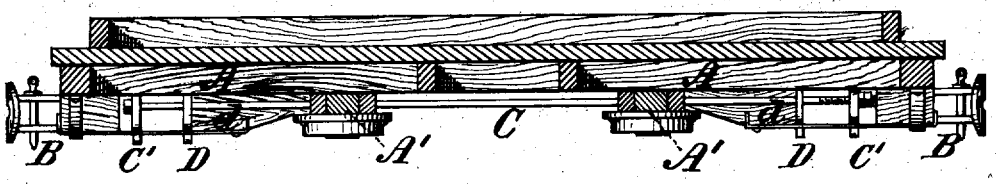
Figure 4:
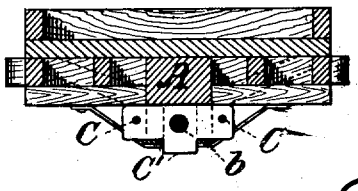

In the accompanying drawings, Figure 1 is an inverted plan view of a car-frame having my invention applied; Fig. 2, a vertical longitudinal section through the same at the line *x x* of Fig. 1; Fig. 3, a similar section at the line *y y* of Fig. 1, and Fig. 4 a vertical transverse section at the line *z z* of Fig. 2.

The frame A of the car is composed of longitudinal and transverse sills, arranged as is usual in American practice, and having two transverse bolsters, A′ A′, to each of which a center-plate, *a*′, to receive the king-bolt or center-pin of a truck, is firmly secured. The tractive or pushing force employed in moving the car is applied to the frame through one or the other of two yielding draw-heads or bumpers, B B, the outer ends of which are suitably formed to receive a coupling link and pin, and which are arranged to slide in guides beneath and in the longitudinal center line of the frame, the draw-heads having a limited degree of longitudinal movement upon the frame, governed by bumper-springs B′, which encircle pins *b* projecting centrally from the inner ends of the draw-heads.

In order that the tractive force applied to the draw-head at one end of the frame shall be transmitted to that at the other end through an independent rigid connection, and not through the sills or timbers of the car-frame, the two draw-heads or bumpers B B are united by draft-rods C C, which are situated at either side of the center-plates *a*′, and may pass through apertures in the frame-bolsters A′, and thus be guided in rectilinear paths during the longitudinal sliding motion which they receive in the application of tractive force to the movement of the car. They may also be supported and prevented from sagging at the center by a hanger depending from or a staple inserted into the under side of the frame; and, for convenience in applying them to the car, each draft-rod may be made in two parts, to be attached together at the center of the car by a bolt-and-jaw connection, or otherwise.

The draft-rods C C are connected by transverse coupling-plates C′ C′, having holes through which the rods pass, so as to move freely therein, and the coupling-plates are held upon the draft-rods by heads *c* at one end of the same, and by nuts *c*′ engaging screw-threads cut upon the opposite end, so that the longitudinal distances apart of the coupling-plates may be diminished but cannot be increased in the operation of the apparatus, as presently to be described.

The pin *b* of each draw-head B passes freely through a central opening in the adjacent coupling-plate C′, and similarly through an opening in a spring-plate, D, within which it is held by a head, nut, or key, as may be convenient.

Each spring-plate is free to move upon the pin of its adjacent draw-head, in the direction of the outer or coupling end thereof, as far as is permitted by the tension of the bumper-spring B′ of said draw-head, which spring bears at one end against the spring-plate D, and at the other against the coupling-plate C′. Motion of the spring-plates D in the opposite direction—that is, toward the bolster A′—is prevented by the fixed abutments *d*, against which said spring-plates bear, and which are secured to the bottom of the frame, and extend from the spring-plates to the outside of the bolsters A′.

The application of springs to the draft apparatus to avoid shocks and the uniting of two coupling or bumper heads by a draft rod or rods independent of the car-frame are not regarded by me as new at the date of my invention; but so far as my knowledge, information, and belief extend, antecedent devices of this character are either liable to the objection that they subject the frame-work to injurious strain in the act of drawing the cars, or expose the draft-rods to constant liability to jamming and bending by compressive strains, when the cars come together, or they involve those injurious characteristics jointly.

With my improved draft and buffing apparatus it will be perceived that in its use the frame is not subjected to strain by applying at or near the leading end of the car the draft or drawing power required to move the car, nor is the strain due to the weight of the following cars sustained by the frame-timbers of the leading car; and, further, that the draft-rods are not liable to be bent or jammed by force applied at their opposite ends, as in backing a train, or when two or more cars come together, for the reason that under no circumstances are they subject to strains of compression. Thus, when the car is drawn in either direction, the power of traction is not applied to the frame at its leading end, but the draw-head B at the leading end, being drawn forward, as permitted by the compression of the bumper-springs B′, carries with it the adjacent spring-plate D and coupling-plate C′, the latter, in turn, carrying with it the draft-rods C, by which the power of traction is applied to the frame-bolster A′, adjacent to the following end of the car, through the bumper-spring B′, spring-plate D, and fixed abutments *d* at that end. In this way the car is moved by a pushing action, or, in other words, impelled from the rear, which entirely obviates the dismemberment or injury which the frame undergoes when pulled at the forward end, as is commonly practiced.

In backing the same advantage arises, from the fact that the cars are pushed or impelled from the end nearest to the engine. The cars which are coupled with and strung behind the forward car are drawn entirely by the draft apparatus, and none of the weight or strain involved in drawing them is appreciated by the forward car.

I am aware that coupling or bumper heads connected by a rigid bar or rod independent of the car-frame, termed a "continuous draw-bar," have been known prior to my invention, and that cars embodying such device were used at an early period in the history of railroads in the United States. An illustration of this principle may be seen in Brees' Railway Practice, fourth series, Plate 4: London, 1847.

I am further aware that in the patent of H. J. Lombaert, No. 31,670, dated March 12, 1861, buffers or coupling-heads connected by rigid draft-rods were combined with springs, by which the tractive force of the engine was applied to both the front and rear bolsters of the car. In neither of these cases, however, was the tractive power applied solely at the rear end of the frame in drawing a car or train forward, and in each of them direct compressive strain was applied to the draft-rod in backing and buffing.

I do not, therefore, broadly claim either a continuous draw-bar or the combination of draft and buffing springs therewith.

I claim as my invention and desire to secure by Letters Patent—

1. The combination, with the frame of a railroad-car, of two yielding draw-heads or bumpers and an intermediate rigid connection, upon which said draw-heads have a sliding movement, whereby strains of draft are transmitted to the car-frame through the rigid connection, and strains of pushing and buffing imparted directly to the frame without acting upon or through said rigid connection, substantially as herein set forth.

2. The combination, with the frame of a railroad-car, of two yielding draw-heads or bumpers, having a free movement upon an intermediate rigid connection, and bumper-springs interposed between said draw-heads and stationary abutments, which transmit the strains of draft and buffing to the frame-bolsters, substantially as and for the purposes set forth.

3. The combination, with the frame of a railroad-car, of two yielding draw-heads or bumpers and an intermediate rigid connection composed of two longitudinal draft-rods, passing through apertures in the frame on each side of the king-bolts or center-pins, and united at their ends by transverse coupling-plates having freedom of movement toward each other upon said draft-rods, substantially as and for the purposes set forth.

EDW. L. CAUM.

Witnesses:

W. E. DOUGHERTY,

WM. A. BOYDEN.